United States Patent
Schroeder et al.

(10) Patent No.: US 10,422,555 B2
(45) Date of Patent: Sep. 24, 2019

(54) REFRIGERATOR APPLIANCE WITH A CALORIC HEAT PUMP

(71) Applicant: Haier US Appliance Solutions, Inc., Wilmington, DE (US)

(72) Inventors: Michael Goodman Schroeder, Louisville, KY (US); Michael Alexander Benedict, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 96 days.

(21) Appl. No.: 15/653,893

(22) Filed: Jul. 19, 2017

(65) Prior Publication Data

US 2019/0024952 A1    Jan. 24, 2019

(51) Int. Cl.
    *F25B 21/00*      (2006.01)
    *F25D 11/02*      (2006.01)
    (Continued)

(52) U.S. Cl.
    CPC .............. *F25B 21/00* (2013.01); *F25D 11/02* (2013.01); *F25D 17/02* (2013.01); *F25D 23/006* (2013.01);
    (Continued)

(58) Field of Classification Search
    CPC .......... F25B 21/00; F25B 21/04; F25B 21/12; F25B 9/145; F25B 5/00; F25B 7/00;
    (Continued)

(56) References Cited

U.S. PATENT DOCUMENTS

| | | |
|---|---|---|
| 668,560 A | 2/1901 | Fulner et al. |
| 1,985,455 A | 12/1934 | Mosby |

(Continued)

FOREIGN PATENT DOCUMENTS

| | | |
|---|---|---|
| CA | 2893874 A1 | 6/2014 |
| CA | 2919117 A1 | 1/2015 |

(Continued)

OTHER PUBLICATIONS

Andrej Kitanovski, Present and future caloric refrigeration and heat-pump technologies, International Journal of Refrigeration, vol. 57, Sep. 2015, pp. 288-298.

(Continued)

*Primary Examiner* — Frantz F Jules
*Assistant Examiner* — Erik Mendoza-Wilkenfel
(74) *Attorney, Agent, or Firm* — Dority & Manning, P.A.

(57) ABSTRACT

A refrigerator appliance includes a fresh food working fluid circuit and a freezer working fluid circuit. The fresh food working fluid circuit couples a fresh food cold side heat exchanger and a first chamber of a regenerator housing such that a first working fluid is flowable between the fresh food cold side heat exchanger and the first chamber. The freezer working fluid circuit couples the freezer cold side heat exchanger and a second chamber of the regenerator housing such that a second working fluid is flowable between the freezer cold side heat exchanger and the second chamber. A liquid-to-liquid heat exchanger connects the fresh food working fluid circuit and the freezer working fluid circuit for heat transfer between the first and second working fluid. A freezing temperature of the first working fluid is greater than a freezing temperature of the second working fluid.

13 Claims, 4 Drawing Sheets

US 10,422,555 B2

Page 2

(51) Int. Cl.
*F25D 17/02* (2006.01)
*F25D 23/00* (2006.01)

(52) U.S. Cl.
CPC . *F25B 2321/002* (2013.01); *F25B 2321/0021* (2013.01)

(58) Field of Classification Search
CPC ........ H01F 1/012; H01F 1/017; F25D 23/066; F25D 23/068; F25D 2321/1412; F25D 11/022; F25D 11/025; F25D 13/04; F25D 21/12; F25D 21/125
See application file for complete search history.

(56) References Cited

U.S. PATENT DOCUMENTS

| | | | |
|---|---|---|---|
| 2,671,929 A | 3/1954 | Gayler |
| 2,765,633 A | 10/1956 | Muffly |
| 3,816,029 A | 6/1974 | Bowen et al. |
| 3,956,076 A | 5/1976 | Powell, Jr. et al. |
| 4,037,427 A | 7/1977 | Kramer |
| 4,102,655 A | 7/1978 | Jeffery et al. |
| 4,107,935 A | 8/1978 | Steyert, Jr. |
| 4,197,709 A | 4/1980 | Hochstein |
| 4,200,680 A | 4/1980 | Sasazawa et al. |
| 4,259,843 A | 4/1981 | Kausch |
| 4,507,927 A | 4/1985 | Barclay |
| 4,507,928 A | 4/1985 | Johnson |
| 4,549,155 A | 10/1985 | Halbach |
| 4,554,790 A | 11/1985 | Nakagome et al. |
| 4,557,228 A | 12/1985 | Samodovitz |
| 4,599,866 A | 7/1986 | Nakagome et al. |
| 4,625,519 A | 12/1986 | Hakuraku et al. |
| 4,642,994 A | 2/1987 | Barclay et al. |
| 4,735,062 A | 4/1988 | Woolley et al. |
| 4,741,175 A | 5/1988 | Schulze |
| 4,785,636 A | 11/1988 | Hakuraku et al. |
| 4,796,430 A | 1/1989 | Malaker et al. |
| 5,091,361 A | 2/1992 | Hed |
| 5,156,003 A | 10/1992 | Yoshiro et al. |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,467,274 B2 | 10/2002 | Barclay et al. |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 9,927,155 B2 | 3/2018 | Boeder et al. |
| 9,978,487 B2 | 5/2018 | Katter et al. |
| 10,006,675 B2 | 6/2018 | Benedict et al. |
| 10,018,385 B2 | 7/2018 | Radermacher et al. |
| 2002/0040583 A1 | 4/2002 | Barclay et al. |
| 2002/0066368 A1 | 6/2002 | Zornes |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187510 A1 | 9/2004 | Jung |
| 2004/0187803 A1 | 9/2004 | Regev |
| 2004/0250550 A1 | 12/2004 | Bruck |
| 2005/0109490 A1 | 5/2005 | Harmon et al. |
| 2005/0274676 A1 | 12/2005 | Kumar et al. |
| 2006/0130518 A1 | 6/2006 | Kang et al. |
| 2006/0231163 A1 | 10/2006 | Hirosawa et al. |
| 2007/0130960 A1 | 6/2007 | Muller et al. |
| 2007/0220901 A1 | 9/2007 | Kobayashi |
| 2008/0236171 A1 | 10/2008 | Saito et al. |
| 2008/0236175 A1 | 10/2008 | Chaparro Monferrer et al. |
| 2008/0303375 A1 | 12/2008 | Carver |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel |
| 2010/0122488 A1 | 5/2010 | Fukai |
| 2010/0162747 A1 | 7/2010 | Hamel et al. |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0061398 A1 | 3/2011 | Shih et al. |
| 2011/0062821 A1 | 3/2011 | Chang et al. |
| 2011/0082026 A1 | 4/2011 | Sakatani et al. |
| 2011/0162388 A1 | 7/2011 | Barve et al. |

(56) References Cited

U.S. PATENT DOCUMENTS

| | | |
|---|---|---|
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2011/0314836 A1 | 12/2011 | Heitzler et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0079834 A1 | 4/2012 | Dinesen |
| 2012/0222427 A1 | 9/2012 | Hassen |
| 2012/0222428 A1 | 9/2012 | Celik et al. |
| 2012/0266591 A1 | 10/2012 | Morimoto et al. |
| 2012/0266607 A1 | 10/2012 | Morimoto et al. |
| 2012/0267090 A1 | 10/2012 | Kruglick |
| 2012/0272665 A1* | 11/2012 | Watanabe ............... F25B 21/00 62/3.1 |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0020529 A1 | 1/2013 | Chang et al. |
| 2013/0104568 A1 | 5/2013 | Kuo et al. |
| 2013/0106116 A1 | 5/2013 | Kuo et al. |
| 2013/0145573 A1 | 6/2013 | Bizhanzadeh |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0325996 A1 | 11/2014 | Muller |
| 2014/0366557 A1* | 12/2014 | Mun ............... F25B 21/00 62/3.1 |
| 2015/0007582 A1 | 1/2015 | Kim et al. |
| 2015/0027133 A1* | 1/2015 | Benedict ............... F25B 21/00 62/3.1 |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0089960 A1 | 4/2015 | Takahashi et al. |
| 2015/0114007 A1 | 4/2015 | Neilson et al. |
| 2015/0168030 A1 | 6/2015 | Leonard et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362225 A1 | 12/2015 | Schwartz |
| 2015/0369524 A1 | 12/2015 | Ikegami et al. |
| 2016/0000999 A1 | 1/2016 | Focht et al. |
| 2016/0084544 A1 | 3/2016 | Radermacher et al. |
| 2016/0091227 A1 | 3/2016 | Leonard et al. |
| 2016/0216012 A1 | 7/2016 | Benedict et al. |
| 2016/0238287 A1 | 8/2016 | Benedict |
| 2016/0282021 A1 | 9/2016 | Zhao et al. |
| 2016/0355898 A1 | 12/2016 | Vieyra Villegas et al. |
| 2016/0356529 A1 | 12/2016 | Humburg |
| 2016/0367982 A1 | 12/2016 | Pennie |
| 2017/0059213 A1 | 3/2017 | Barclay et al. |
| 2017/0071234 A1 | 3/2017 | Garg |
| 2017/0138648 A1 | 5/2017 | Cui et al. |
| 2017/0176083 A1 | 6/2017 | Sul et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |
| 2018/0023852 A1 | 1/2018 | Schroeder et al. |

FOREIGN PATENT DOCUMENTS

| | | | |
|---|---|---|---|
| CN | 101979937 A | 2/2011 | |
| CN | 201772566 U | 3/2011 | |
| CN | 101788207 B | 9/2011 | |
| CN | 202432596 U | 9/2012 | |
| CN | 103090583 A | 5/2013 | |
| CN | 103712401 A | 4/2014 | |
| CN | 102077303 B | 4/2015 | |
| CN | 106481842 A | 3/2017 | |
| DE | 102013223959 A1 | 5/2015 | |
| DE | 202015106851 U1 | 3/2016 | |
| EP | 0187078 A1 | 7/1986 | |
| EP | 2071255 A1 | 6/2009 | |
| EP | 2108904 A1 | 10/2009 | |
| EP | 2215955 A1 | 8/2010 | |
| EP | 2322072 A2 | 5/2011 | |
| EP | 2017207222 A | 11/2017 | |
| EP | 3306082 A2 | 4/2018 | |
| FR | 2935468 A1 | 3/2010 | |
| JP | 59232922 | 12/1984 | |
| JP | H08166182 A | 6/1996 | |
| JP | 3205196 B2 | 9/2001 | |
| JP | 2002315243 A | 10/2002 | |
| JP | 2007147136 A | 6/2007 | |
| JP | 2007291437 A | 11/2007 | |
| JP | 2008051412 A | 3/2008 | |
| JP | 2010112606 A | 5/2010 | |
| JP | 2010525291 A | 7/2010 | |
| JP | 6212955 B2 | 12/2014 | |
| JP | 2014228216 A | 12/2014 | |
| JP | 6079498 B2 | 2/2017 | |
| KR | 101100301 B1 | 12/2011 | |
| KR | 1238234 B1 | 3/2013 | |
| WO | WO 0212800 A1 | 2/2002 | |
| WO | WO 03016794 A1 | 2/2003 | |
| WO | WO 2004/068512 | 8/2004 | |
| WO | WO 2007/036729 A1 | 4/2007 | |
| WO | WO 2009/024412 | 2/2009 | |
| WO | WO-2010119591 A1 * | 10/2010 | ............... F25B 5/04 |
| WO | WO 2011034594 A1 | 3/2011 | |
| WO | WO 2014099199 A1 | 6/2014 | |
| WO | WO 2014170447 A1 | 10/2014 | |
| WO | WO 2014173787 A1 | 10/2014 | |
| WO | WO 2015017230 A1 | 2/2015 | |
| WO | WO2016035267 A1 | 3/2016 | |
| WO | WO 2017042266 A1 | 3/2017 | |
| WO | WO2017097989 A1 | 6/2017 | |

OTHER PUBLICATIONS

International Search Report issued in connection with PCT Application No. PCT/US2014/042485 dated Oct. 23, 2014.
International Search Report issued in connection with PCT Application No. PCT/US2014/017431 dated May 9, 2014.
International search report issued in connection with PCT/US2013/070518, dated Jan. 22, 2014.
Tetsuji Okamura, Performance of a room-temperature rotary magnet refrigerator, dated Nov. 28, 2005, Elsevier.

(56) References Cited

OTHER PUBLICATIONS

Journal of Alloys and Compounds, copyright 2008 Elsevier B..V.. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.
Effects of annealing on the magnetic entropy change and exchange bias behavior in melt-spun Ni—Mn—In ribbons, X.Z. Zhao, C.C. Hsieh, et al Science Direct, Scripta Materialia 63 (2010).
PCT International Search Report and Written Opinion issued in connection with PCT Application No. PCT/US2013/070023 dated Feb. 27, 2014.
Barbara Pulko, Epoxy-bonded La—Fe—Co—Si magnetocaloric plates, Journal of Magnetism and Magnetic Materials, 375 (2015) 65-73.
International Search Report of PCT/US2014/047925 dated Nov. 10, 2014.
C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.

\* cited by examiner

REFRIGERATOR APPLIANCE WITH A CALORIC HEAT PUMP

FIELD OF THE INVENTION

The present subject matter relates generally to heat pumps, such as magneto-caloric heat pumps.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or transfer heat energy from one location to another. This cycle can be used to receive heat from a refrigeration compartment and reject such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of MCMs become more ordered under an increasing, externally applied magnetic field and cause the MCMs to generate heat. Conversely, decreasing the externally applied magnetic field allows the magnetic moments of the MCMs to become more disordered and allow the MCMs to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCMs can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in a refrigerator appliance would also be useful.

BRIEF DESCRIPTION OF THE INVENTION

The present subject matter provides a refrigerator appliance. The refrigerator appliance includes a fresh food working fluid circuit and a freezer working fluid circuit. The fresh food working fluid circuit couples a fresh food cold side heat exchanger and a first chamber of a regenerator housing such that a first working fluid is flowable between the fresh food cold side heat exchanger and the first chamber. The freezer working fluid circuit couples the freezer cold side heat exchanger and a second chamber of the regenerator housing such that a second working fluid is flowable between the freezer cold side heat exchanger and the second chamber. A liquid-to-liquid heat exchanger connects the fresh food working fluid circuit and the freezer working fluid circuit for heat transfer between the first and second working fluid. A freezing temperature of the first working fluid is greater than a freezing temperature of the second working fluid. Additional aspects and advantages of the invention will be set forth in part in the following description, or may be apparent from the description, or may be learned through practice of the invention.

In a first example embodiment, a refrigerator appliance is provided. The refrigerator appliance includes a cabinet that defines a fresh food chamber and a freezer chamber. A hot side heat exchanger is positioned outside of the fresh food chamber and the freezer chamber of the cabinet. A fresh food cold side heat exchanger is positioned within the cabinet at the fresh food chamber. The fresh food chamber is chillable with air from the fresh food cold side heat exchanger. A freezer cold side heat exchanger is positioned within the cabinet at the freezer chamber. The freezer chamber is chillable with air from the freezer cold side heat exchanger. A regenerator housing has a first chamber and a second chamber. The first and second chambers are separate from each other within the regenerator housing. A caloric material is disposed within the regenerator housing. The caloric material has a first portion and a second portion. The first portion of the caloric material is disposed within the first chamber. The second portion of the caloric material is disposed within the second chamber. A fresh food working fluid circuit couples the fresh food cold side heat exchanger and the first chamber such that a first working fluid is flowable between the fresh food cold side heat exchanger and the first chamber. The hot side heat exchanger is also coupled to the fresh food working fluid circuit such that the first working fluid is flowable between the hot side heat exchanger and the first chamber. A freezer working fluid circuit couples the freezer cold side heat exchanger and the second chamber such that a second working fluid is flowable between the freezer cold side heat exchanger and the second chamber. A liquid-to-liquid heat exchanger connects the fresh food working fluid circuit and the freezer working fluid circuit for heat transfer between the first and second working fluid. A pump is connected to the fresh food working fluid circuit and the freezer working fluid circuit. The pump is operable to flow the first working fluid through the fresh food working fluid circuit and to flow the second working fluid through the freezer working fluid circuit. A freezing temperature of the first working fluid is greater than a freezing temperature of the second working fluid.

In a second example embodiment, a refrigerator appliance is provided. The refrigerator appliance includes a cabinet that defines a fresh food chamber and a freezer chamber. A fresh food cold side heat exchanger is positioned within the cabinet at the fresh food chamber. The fresh food chamber is chillable with air from the fresh food cold side heat exchanger. A freezer cold side heat exchanger is positioned within the cabinet at the freezer chamber. The freezer chamber is chillable with air from the freezer cold side heat exchanger. A regenerator housing has a first chamber and a second chamber. The first and second chambers are separate from each other within the regenerator housing. A caloric material is disposed within the regenerator housing. The caloric material has a first portion and a second portion. The first portion of the caloric material is disposed within the first chamber. The second portion of the caloric material is disposed within the second chamber. A fresh food working fluid circuit couples the fresh food cold side heat exchanger and the first chamber such that a first working fluid is flowable between the fresh food cold side heat exchanger and the first chamber. A freezer working fluid circuit couples the freezer cold side heat exchanger and the second chamber such that a second working fluid is flowable between the freezer cold side heat exchanger and the second chamber. A liquid-to-liquid heat exchanger connects the fresh food working fluid circuit and the freezer working fluid circuit for heat transfer between the first and second working fluid. A pump is connected to the fresh food working fluid circuit and the freezer working fluid circuit. The pump is operable to flow the first working fluid through the fresh food working fluid circuit and to flow the second working fluid through the freezer working fluid circuit. A freezing temperature of the first working fluid is greater than a freezing temperature of the second working fluid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
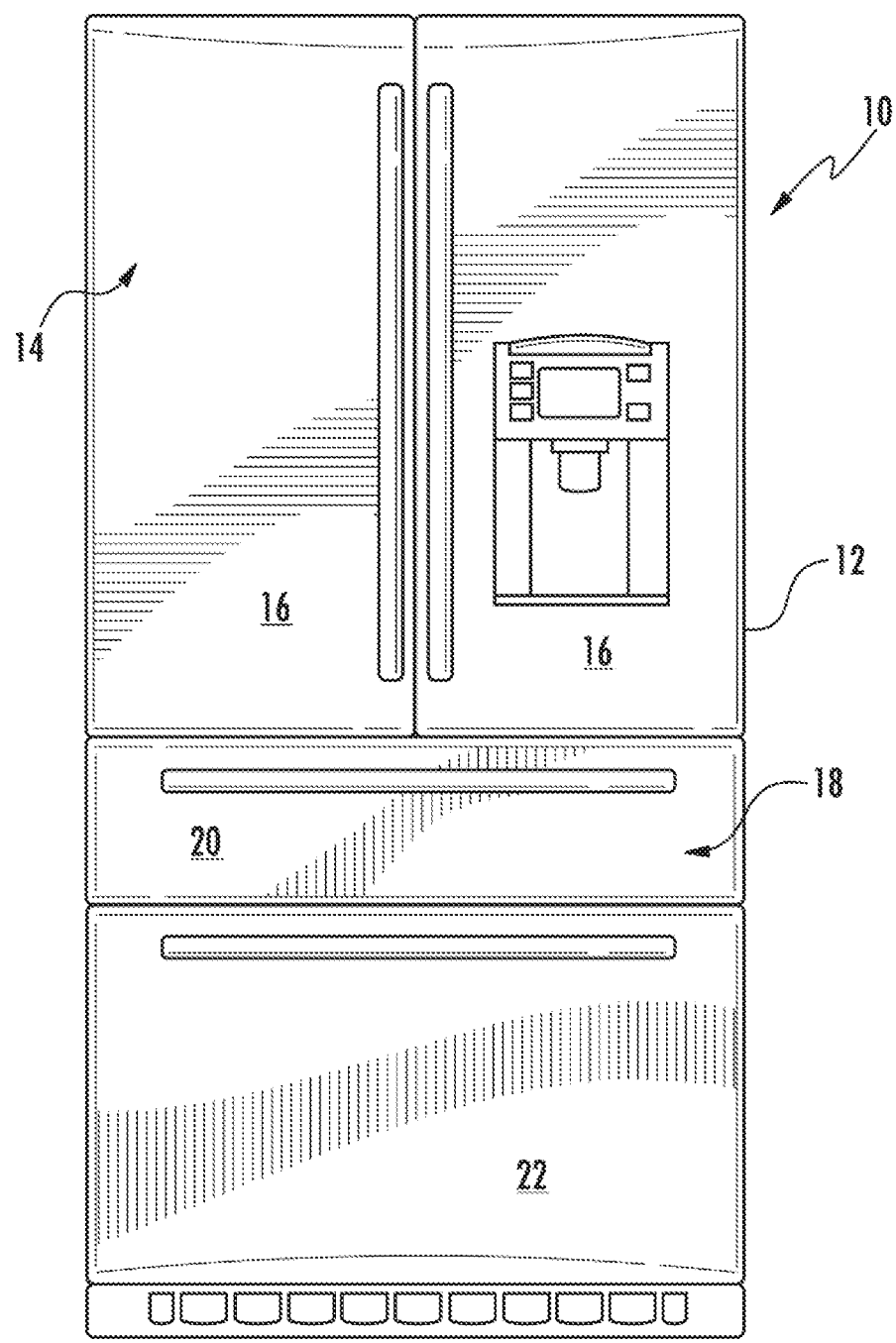
FIG. 1 is a refrigerator appliance in accordance with an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a caloric heat pump system for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool liquid/water within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Referring now to FIG. 1, an example embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. Drawers 20, 22 are "pull-out" type drawers in that they can be manually moved into and out of freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present disclosure is not limited to refrigerator appliances and may be used in other applications as well such as e.g., air-conditioning, electronics cooling devices, and others. Thus, it should be understood that while the use of a heat pump and heat pump system to provide cooling within a refrigerator is provided by way of example herein, the present disclosure may also be used to provide for heating applications as well.

Figure 2:
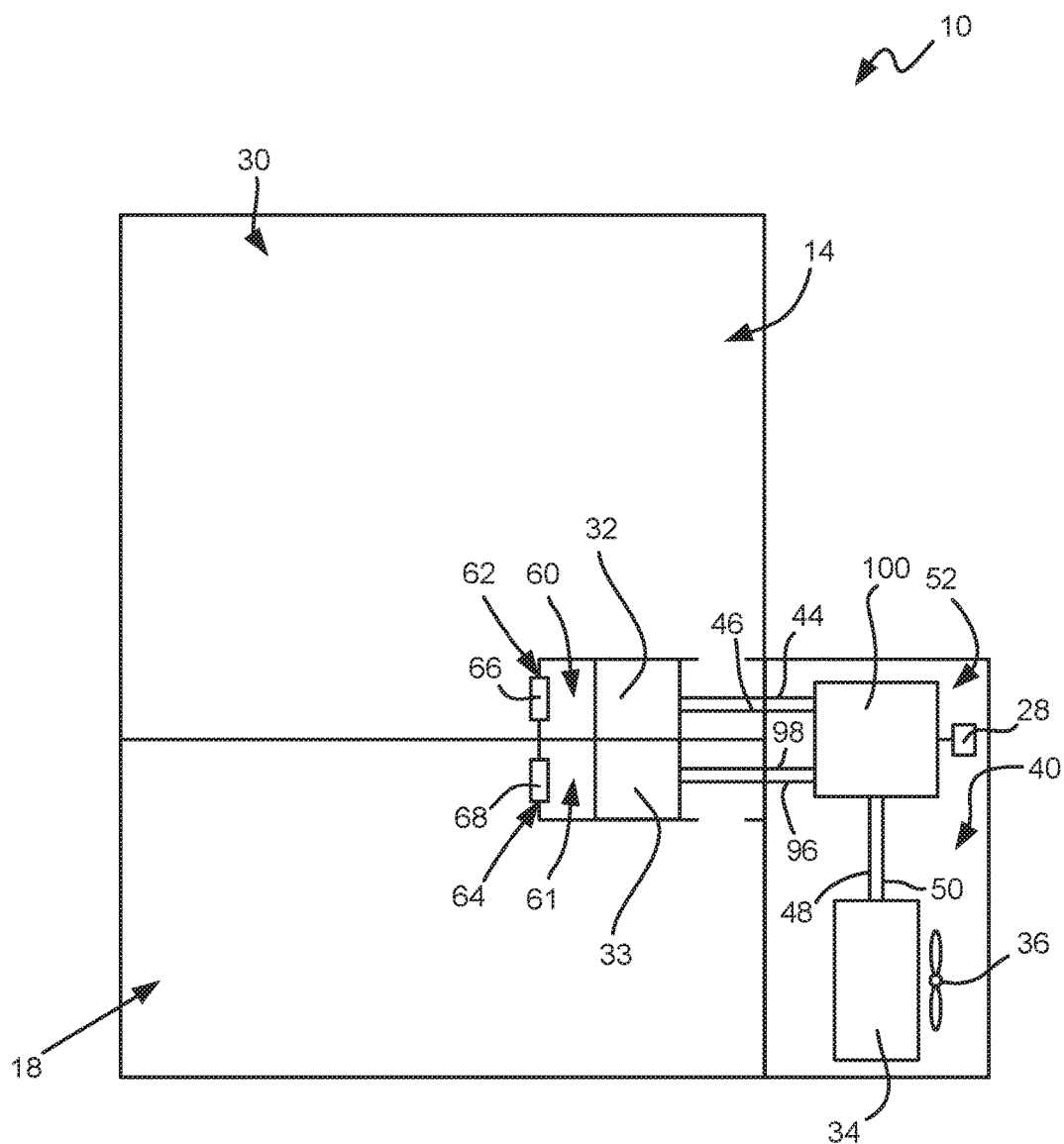
FIG. 2 is a schematic illustration of certain components of a heat pump system positioned in the example refrigerator appliance of FIG. 1.

FIG. 2 is a schematic view of various components of refrigerator appliance 10, including refrigeration compartments 30 (e.g., fresh-food compartments 14 and freezer compartment 18) and a machinery compartment 40. Refrigeration compartment 30 and machinery compartment 40 include a heat pump system 52 having a fresh food or first cold side heat exchanger 32 positioned in refrigeration compartments 30 for the removal of heat therefrom. A heat transfer fluid such as e.g., an aqueous solution, flowing within first cold side heat exchanger 32 receives heat from refrigeration compartment 30 thereby cooling contents of refrigeration compartment 30.

As may be seen in FIG. 2, heat pump system 52 also has a second cold side heat exchanger 33. Second cold side heat exchanger 33 operates in parallel with first cold side heat exchanger 32 to cool refrigeration compartments 30, e.g., a respective one of fresh-food compartment 14 and freezer chamber 18. For example, first cold side heat exchanger 32 may be positioned at or adjacent fresh-food compartment 14, and air from first cold side heat exchanger 32 may cool fresh-food compartment 14. Conversely, second cold side heat exchanger 33 may be positioned at or adjacent freezer compartment 18, and air from second cold side heat exchanger 33 may cool freezer compartment 18. Thus, herein, first cold side heat exchanger 32 may also be referred to as a fresh food cold side heat exchanger, and second cold side heat exchanger 33 may also be referred to as a freezer cold side heat exchanger.

The heat transfer fluid flows out of first cold side heat exchanger 32 by line 44 to heat pump 100. As will be further described herein, the heat transfer fluid receives additional heat from magneto-caloric material (MCM) in heat pump 100 and carries this heat by line 48 to a third or hot side heat exchanger 34. Heat is released to the environment, machinery compartment 40, and/or other location external to refrigeration compartment 30 using hot side heat exchanger 34. A fan 36 may be used to create a flow of air across hot side heat exchanger 34 and thereby improve the rate of heat transfer to the environment. A pump or pumps (not shown) cause the heat transfer fluid to recirculate in heat pump system 52. Motor 28 is in mechanical communication with heat pump 100 and is operable to provide relative motion between a field generator and a regenerator housing, as discussed in greater detail below.

From hot side heat exchanger 34, the heat transfer fluid returns by line 50 to heat pump 100 where, as will be further described below, the heat transfer fluid loses heat to the MCM in heat pump 100. The now colder heat transfer fluid flows by line 46 to first cold side heat exchanger 32 to receive heat from refrigeration compartment 30 and repeat the cycle as just described.

The heat transfer fluid may flow to second cold side heat exchanger 33 in the manner described above for first cold side heat exchanger 32. For example, heat transfer fluid flows by line 96 to second cold side heat exchanger 33 from heat pump 100, and heat transfer fluid flows by line 98 to heat pump 100 from second cold side heat exchanger 33. Heat pump system 52 is provided by way of example only. Other configurations of heat pump system 52 may be used as well. For example, lines 44, 46, 48, 50, 96, 98 provide fluid communication between the various components of heat pump system 52 but other heat transfer fluid recirculation loops with different lines and connections may also be employed. Still other configurations of heat pump system 52 may be used as well.

Refrigerator appliance 10 also includes features for regulating air flow across first cold side heat exchanger 32 to fresh-food compartment 14 and across second cold side heat exchanger 33 to freezer compartment 18. As may be seen in FIG. 2, first cold side heat exchanger 32 is positioned within a first heat exchanger compartment 60 that is defined within cabinet 12, e.g., between fresh-food compartments 14 and freezer compartment 18. Fresh-food compartment 14 is contiguous with first heat exchanger compartment 60 through a fresh food duct 62. Thus, air may flow between fresh-food compartment 14 and first heat exchanger compartment 60 via fresh food duct 62. Second cold side heat exchanger 33 is positioned within a second heat exchanger compartment 61 that is defined within cabinet 12, e.g., between fresh-food compartments 14 and freezer compartment 18. Freezer compartment 18 is contiguous with second heat exchanger compartment 61 through a freezer duct 64. Thus, air may flow between freezer compartment 18 and second heat exchanger compartment 61 via freezer duct 64. First heat exchanger compartment 61 may be separate from second heat exchanger compartment 61 within cabinet 12. In addition, fresh food duct 62 may be separate from freezer duct 64 within cabinet 12, in certain exemplary embodiments.

Refrigerator appliance 10 also includes a fresh food fan 66 and a freezer fan 68. Fresh food fan 66 may be positioned at or within fresh food duct 62. Fresh food fan 66 is operable to force air flow between fresh-food compartment 14 and first heat exchanger compartment 60 through fresh food duct 62. Fresh food fan 66 may thus be used to create a flow of air across first cold side heat exchanger 32 and thereby improve the rate of heat transfer. Freezer fan 68 may be positioned at or within freezer duct 64. Freezer fan 68 is operable to force air flow between freezer compartment 18 and second heat exchanger compartment 61 through freezer duct 64. Freezer fan 68 may thus be used to create a flow of air across second cold side heat exchanger 33 and thereby improve the rate of heat transfer.

Operation of heat pump system 52 and fresh food fan 66 allows chilled air from first cold side heat exchanger 32 to cool fresh-food compartment 14, e.g., to about forty degrees Fahrenheit (40° F.). Similarly, operation of heat pump system 52 and freezer fan 68 allows chilled air from second cold side heat exchanger 33 to cool freezer compartment 18, e.g., to about negative ten degrees Fahrenheit (−10° F.). Thus, first cold side heat exchanger 32 may chill fresh-food compartment 14 and second cold side heat exchanger 33 may chill freezer compartment 18 during operation of heat pump system 52. In such a manner, first and second cold side heat exchangers 32, 33 may separately cool fresh-food compartments 14 and freezer compartment 18.

Figure 3:
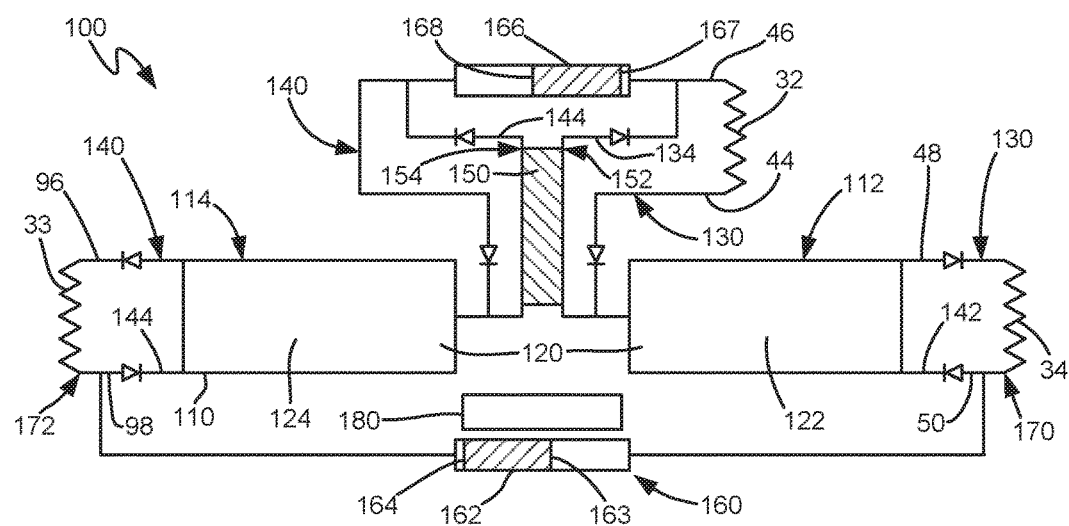
FIGS. 3 and 4 provide schematic views of a heat pump of the example heat pump system of FIG. 2.
Figure 4:
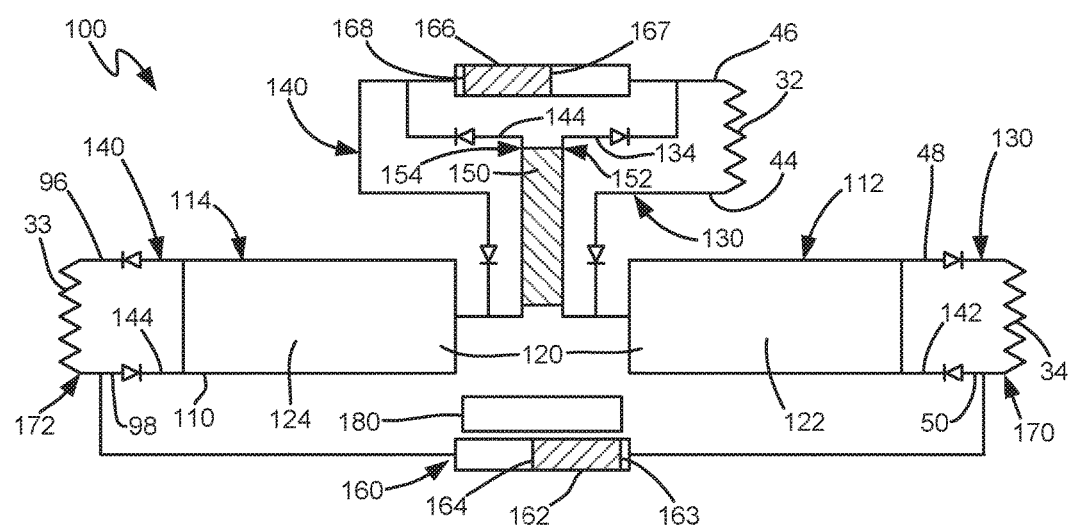

FIGS. 3 and 4 illustrate an example heat pump 100 and components thereof, and the use of heat pump 100 with heat pump system 52, in accordance with example embodiments of the present disclosure. Heat pump 100 shown in FIGS. 3 and 4 may be suitable for use within a linear reciprocating caloric heat pump. Thus, it will be understood that the present subject matter may be used in or with any suitable heat pump, including linear caloric heat pumps. However, the example heat pumps 100 provided herein are not intended to limit the present subject matter to the particular heat pump arrangement of FIGS. 3 and 4.

As may be seen in FIGS. 3 and 4, heat pump 100 includes a regenerator housing 110. Regenerator housing 110 has a first chamber 112 and a second chamber 114. First and second chambers 112, 114 are separate from each other within regenerator housing 110. Thus, e.g., first chamber 112 is not in fluid communication with second chamber 114, and working fluid within first chamber 112 does not mix with working fluid within first chamber 112. A wall, partition or membrane of regenerator housing 110 may be positioned between first and second chambers 112, 114 to separate first and second chambers 112, 114 from each other within regenerator housing 110.

A caloric material 120 is disposed within regenerator housing 110. In particular, caloric material 120 has a first portion 122 and a second portion 124. First portion 122 of caloric material 120 is disposed within first chamber 112 of regenerator housing 110, and second portion 124 of caloric material 120 is disposed within second chamber 114 of regenerator housing 110. As discussed above, first and second chambers 112, 114 are separate from each other within regenerator housing 110. Thus, first and second portions 122, 124 of caloric material 120 are also separate from each other within regenerator housing 110.

First and second portions 122, 124 of caloric material 120 may be any suitable type or combination of caloric material. For example, first portion 122 of caloric material 120 may be a caloric material or cascade of caloric materials selected (and/or sized) to suitably cool working fluid supplied to first cold side heat exchanger 32 to a temperature suitable for cooling fresh-food compartment 14 to a set temperature of fresh-food compartment 14, e.g., about thirty-seven degrees Fahrenheit (37° F.). Conversely, second portion 124 of caloric material 120 may be a caloric material or cascade of caloric materials selected (and/or sized) to suitably cool working fluid supplied to second cold side heat exchanger 33 to a temperature suitable for cooling freezer compartment 18 to a set temperature of freezer compartment 18, e.g., about zero degrees Fahrenheit (0° F.). Thus, first and second portions 122, 124 of caloric material 120 may include common or different caloric materials, and first and second portions 122, 124 of caloric material 120 may have different sizes (e.g., cross-sectional areas and/or lengths).

A fresh food working fluid circuit 130 couples first cold side heat exchanger 32 and first chamber 112 of regenerator housing 110. Within fresh food working fluid circuit 130, a first working fluid is flowable between first cold side heat exchanger 32 and first chamber 112 of regenerator housing 110. Hot side heat exchanger 34 is also coupled to fresh food working fluid circuit 130. Thus, the first working fluid is also flowable between hot side heat exchanger 34 and first chamber 112 of regenerator housing 110 within fresh food working fluid circuit 130. Fresh food working fluid circuit 130 may include lines 44, 46, 48, 50 for connecting first cold side heat exchanger 32 and hot side heat exchanger 34 with first chamber 112 of regenerator housing 110. As shown in FIGS. 3 and 4, fresh food working fluid circuit 130 includes check valves (not labeled) that regulate the direction of the flow of the first working fluid through fresh food working fluid circuit 130, e.g., to a single flow direction within fresh food working fluid circuit 130.

A freezer working fluid circuit 140 couples second cold side heat exchanger 33 and second chamber 114 of regenerator housing 110. Within freezer working fluid circuit 140, a second working fluid is flowable between second cold side heat exchanger 33 and second chamber 114 of regenerator housing 110. Fresh food working fluid circuit 130 may include lines 96, 98 for connecting second cold side heat exchanger 33 with second chamber 114 of regenerator housing 110. As shown in FIGS. 3 and 4, freezer working fluid circuit 140 includes check valves (not labeled) that regulate the direction of the flow of the second working fluid through freezer working fluid circuit 140, e.g., to a single flow direction within freezer working fluid circuit 140.

A liquid-to-liquid heat exchanger 150 connects fresh food working fluid circuit 130 and freezer working fluid circuit 140 for heat transfer between the first and second working fluid. In particular, the first and second working fluids may flow through liquid-to-liquid heat exchanger 150 without mixing. Liquid-to-liquid heat exchanger 150 may be positioned upstream of first cold side heat exchanger 32 on fresh food working fluid circuit 130, e.g., on line 46.

A pump 160 is connected to fresh food working fluid circuit 130 and freezer working fluid circuit 140. Pump 160 is operable to flow the first working fluid through fresh food working fluid circuit 130 and to flow the second working fluid through freezer working fluid circuit 140. Thus, a single pump 160 may flow two working fluids (the first and second working fluids) through two separate fluid circuits within heat pump system 52.

The first and second working fluids are two different working fluids. In particular, the first and second working fluids are selected such that a freezing temperature of the first working fluid is greater than a freezing temperature of the second working fluid. As an example, the first working fluid may be purified water, and the second working fluid may be a mixture of water and one or more of propylene glycol or ethylene glycol. As another example, the first working fluid may be purified water, and the second working fluid may include alcohol. Thus, the first working fluid may be purified water, and the second working fluid may be some other working fluid with a lower freezing temperature.

Purified water has desirable heat transfer properties but freezes below thirty-two degrees Fahrenheit (32° F.). Thus, purified water is suitable for the working fluid in first cold side heat exchanger 32 at fresh-food compartment 14 but is not suitable for the working fluid in second cold side heat exchanger 33 at freezer compartment 18. Utilizing purified water within fresh food working fluid circuit 130 efficiently cools fresh-food compartment 14 with first cold side heat exchanger 32, and utilizing another working fluid with a lower freezing temperature within freezer working fluid circuit 140 to cool freezer compartment 18 with second cold side heat exchanger 33 prevent freezing of the second working fluid within freezer working fluid circuit 140.

An efficiency of heat pump 100 with two different working fluids can be increased relative to a heat pump with a single working fluid. As a baseline, utilizing forty-five percent (45%) ethylene glycol and remainder water as both the first and second working fluids provides a simulated seventeen percent (17%) adjusted Carnot efficiency for the freezer span. Conversely, utilizing purified water in the fresh food working fluid circuit 130 and forty-five percent (45%) ethylene glycol with remainder water in the freezer working fluid circuit 140 provides a simulated thirty-five percent (35%) adjusted Carnot efficiency for the freezer span. Thus, a dual working fluid heat pump can have up to double the efficiency of a single working fluid heat pump.

With the first and second working fluids being two different working fluids, first portion 122 of caloric material 120 in combination with first cold side heat exchanger 32 and hot side heat exchanger 34 may be configured such that a temperate span of the first working fluid is between about thirty-three degrees Fahrenheit (33° F.) and one hundred and five degrees Fahrenheit (105° F.). Similarly, second portion 124 of caloric material 120 in combination with second cold side heat exchanger 33 may be configured such that a temperate span of the second working fluid is between about negative ten degrees Fahrenheit (−10° F.) and forty-five degrees Fahrenheit (45° F.).

As shown in FIGS. 3 and 4, pump 160 may include a first piston set 162 and a second piston set 166. First and second piston sets 162, 166 are synchronized, e.g., such that first and second piston sets 162, 166 oppositely draw or fill with working fluid within fresh food and freezer working fluid circuits 130, 140. Thus, a system volume within fresh food and freezer working fluid circuits 130, 140 may be maintained with first and second piston sets 162, 166.

Fresh food working fluid circuit 130 includes a hot side outlet conduit 142. Hot side outlet conduit 142 extends between an outlet 170 of hot side heat exchanger 34 and first chamber 112 of regenerator housing 110. Similarly, freezer working fluid circuit 140 includes a freezer outlet conduit 144. Freezer outlet conduit 144 extends between an outlet 172 of second cold side heat exchanger 33 and second chamber 114 of regenerator housing 110. First piston set 162 may be coupled to hot side outlet conduit 142 and freezer outlet conduit 144. In particular, first piston set 162 has a first piston head 163 and a second piston head 164. First piston head 163 of first piston set 162 is in fluid communication with hot side outlet conduit 142. Conversely, second piston head 164 of first piston set 162 is in fluid communication with freezer outlet conduit 144. First and second piston heads 163, 164 of first piston set 162 reciprocate to flow working fluid through fresh food working fluid circuit 130 and freezer working fluid circuit 140. In particular, the first working fluid within fresh food working fluid circuit 130 is urged through fresh food working fluid circuit 130 by first piston head 163 of first piston set 162, and the second working fluid within freezer working fluid circuit 140 is urged through freezer working fluid circuit 140 by second piston head 164 of first piston set 162. First and second piston heads 163, 164 of first piston set 162 may be synchronized to oppositely reciprocate. Thus, e.g., the expansion and suction strokes of first and second piston heads 163, 164 of first piston set 162 may be opposite each other.

As may be seen in FIGS. 3 and 4, fresh food working fluid circuit 130 includes a liquid-to-liquid outlet conduit 134. Liquid-to-liquid outlet conduit 134 of fresh food working fluid circuit 130 extends between a first outlet 152 of liquid-to-liquid heat exchanger 150 and first chamber 112 of regenerator housing 110. Similarly, freezer working fluid circuit 140 includes a liquid-to-liquid outlet conduit 144 that extends between a second outlet 154 of liquid-to-liquid heat exchanger 150 and the second chamber 114 of regenerator housing 110. Second piston set 166 may be coupled to liquid-to-liquid outlet conduits 134, 144. In particular, second piston set 166 has a first piston head 167 and a second piston head 168. First piston head 167 of second piston set 166 is in fluid communication with liquid-to-liquid outlet conduit 134 of fresh food working fluid circuit 130. Conversely, second piston head 168 of second piston set 166 is in fluid communication with liquid-to-liquid outlet conduit 144 of freezer working fluid circuit 140. First and second piston heads 167, 168 of second piston set 166 reciprocate to assist with flowing working fluid through fresh food working fluid circuit 130 and freezer working fluid circuit 140. First and second piston heads 167, 168 of second piston set 166 may be synchronized to oppositely reciprocate. Thus, e.g., the expansion and suction strokes of first and second piston heads 167, 168 of second piston set 166 may be opposite each other.

Pump 160 may be powered with a motor 180, e.g., by a rotary crank, magnetic field, etc. As shown in FIGS. 3 and 4, motor 180 may be coupled to first piston set 162, and motor 180 may reciprocate first and second piston heads 163, 164 of first piston set 162 to flow the first working fluid through fresh food working fluid circuit 130 and that second working fluid through freezer working fluid circuit 140. Conversely, in FIGS. 3 and 4, motor 180 is not coupled to second piston set 166, and second piston set 166 is unpowered. Thus, first and second piston heads 167, 168 of second piston set 166 may reciprocate due to working fluid flow within fresh food and freezer working fluid circuits 130, 140 in order to maintain system volume during operation of motor 180 to reciprocate first and second piston heads 163, 164 of first piston set 162. In alternative example embodiments, second piston set 166 may be powered by motor 180, and first piston set 162 may be unpowered by motor 180. In other alternative example embodiments, both first and second piston sets 162, 166 may be powered by motor 180 (or separate motors).

Figure 5:
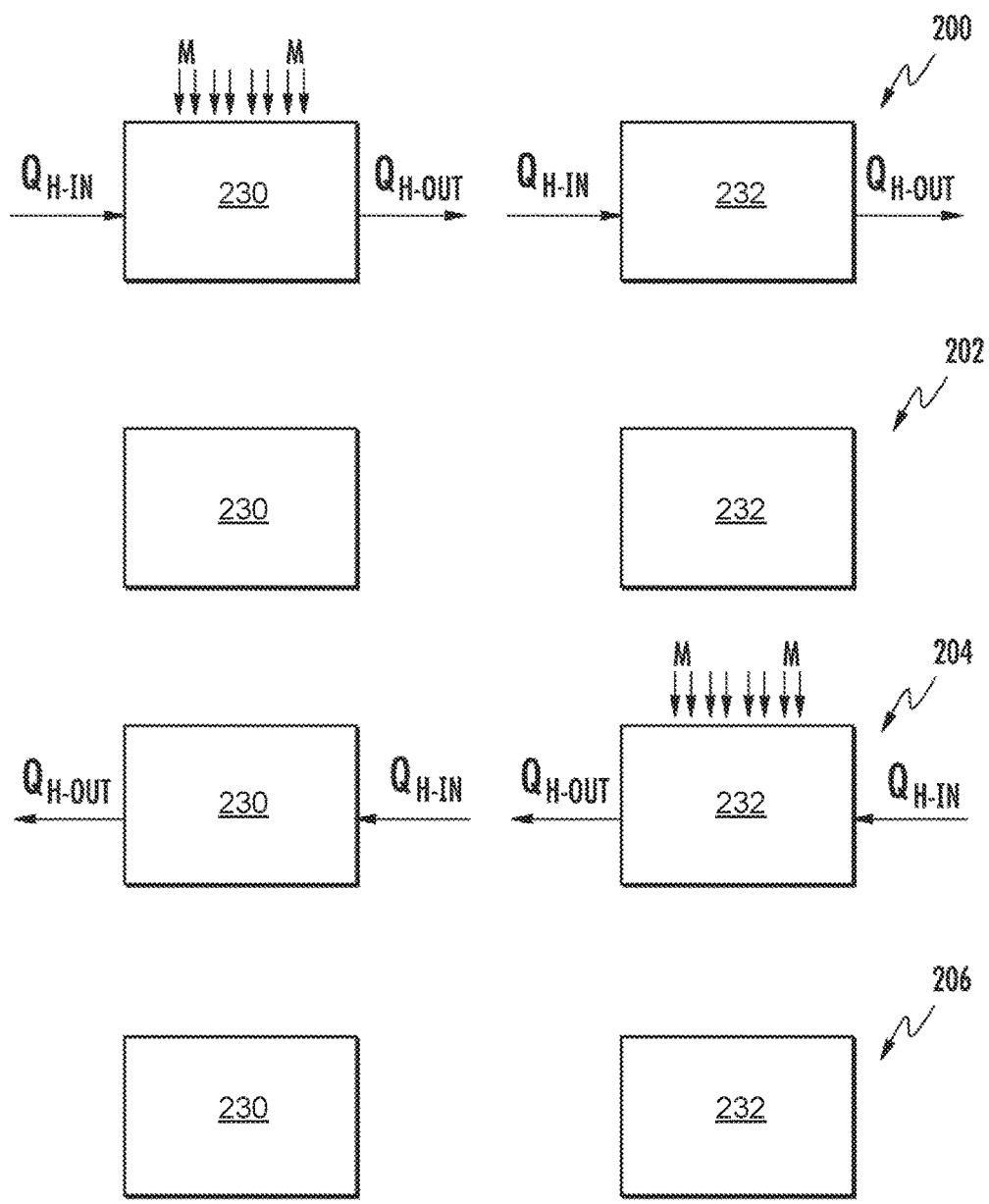
FIG. 5 is a schematic diagram illustrating various positions and movements there-between of MCM stages in accordance with an exemplary embodiment of the present disclosure.

FIG. 5 illustrates an exemplary method of the present disclosure using a schematic representation of associated stages 230, 232 of MCM during dwelling in and movement between the various positions as discussed herein. With regard to first stage 230, during step 200, which corresponds to the first position, stage 230 is fully within magnetic field M, which causes the magnetic moments of the material to orient and the MCM to heat as part of the magneto caloric effect. Further, pump 160 actively flows working fluid. As indicated by arrow $Q_{H\text{-}OUT}$, working fluid in stage 230, now heated by the MCM, can travel out of stage 230 and along line 48 to first hot side heat exchanger 34. At the same time, and as indicated by arrow $Q_{H\text{-}IN}$, working fluid from cold side heat exchanger 32 flows into stage 230 from line 44. Because working fluid from cold side heat exchanger 32 is relatively cooler than the MCM in stage 230, the MCM will lose heat to the working fluid.

In step 202, stage 230 is moved from the first position to the second position in the first transition. During the time in the first transition, working fluid dwells in the MCM of stage 230. More specifically, the working fluid does not actively flow through stage 230.

In step 204, stage 230 is in the second position and thus out of magnetic field M. The absence or lessening of the magnetic field is such that the magnetic moments of the material become disordered and the MCM absorbs heat as part of the magnetocaloric effect. Further, pump 160 actively flows working fluid. As indicated by arrow $Q_{C\text{-}OUT}$, working fluid in stage 230, now cooled by the MCM, can travel out of stage 230 and along line 46 to cold side heat exchanger 32. At the same time, and as indicated by arrow $Q_{C\text{-}IN}$, working fluid from first hot side heat exchanger 34 flows into stage 112 from line 50 when stage 230 is in the second transition. Because working fluid from first hot side heat exchanger 34 is relatively warmer than the MCM in stage 230, the MCM will lose some of its heat to the working fluid. The working fluid now travels along line 46 to cold side heat exchanger 32 to receive heat and cool refrigeration compartment 30.

In step 206, stage 230 is moved from the second position to the first position in the second transition. During the time in the second transition, the working fluid dwells in the MCM of stage 230. More specifically, the working fluid does not actively flow through stage 230.

With regard to second stage 232, during step 200, which corresponds to the first position, second stage 232 is out of magnetic field M. The absence or lessening of the magnetic field is such that the magnetic moments of the material become disordered and the MCM absorbs heat as part of the magneto-caloric effect. Further, pump 160 actively flows working fluid. As indicated by arrow $Q_{C\text{-}OUT}$, working fluid in stage 232, now cooled by the MCM, can travel out of stage 232 and along line 46 to cold side heat exchanger 32. At the same time, and as indicated by arrow $Q_{C\text{-}IN}$, working fluid from first hot side heat exchanger 34 flows into stage 112 from line 50 when stage 232 is in the second transition. Because working fluid from first hot side heat exchanger 34 is relatively warmer than the MCM in stage 232, the MCM will lose some of its heat to the working fluid. The working fluid now travels along line 46 to cold side heat exchanger 32 to receive heat and cool the refrigeration compartment 30.

In step 202, stage 232 is moved from the first position to the second position in the first transition. During the time in the first transition, working fluid dwells in the MCM of stage 232. More specifically, the working fluid does not actively flow through stage 232.

In step 204, stage 232 is in the second position and thus fully within magnetic field M, which causes the magnetic moments of the material to orient and the MCM to heat as part of the magneto caloric effect. Further, pump 160 actively flows working fluid. As indicated by arrow $Q_{H\text{-}OUT}$, working fluid in stage 232, now heated by the MCM, can travel out of stage 232 and along line 48 to first hot side heat exchanger 34. At the same time, and as indicated by arrow $Q_{H\text{-}IN}$, working fluid from cold side heat exchanger 32 flows into stage 232 from line 44. Because working fluid from cold side heat exchanger 32 is relatively cooler than the MCM in stage 232, the MCM will lose heat to the working fluid.

In step 206, stage 232 is moved from the second position to the first position in the second transition. During the time in the second transition, working fluid dwells in the MCM of stage 232. More specifically, the working fluid does not actively flow through stage 232.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
   a cabinet defining a fresh food chamber and a freezer chamber;
   a hot side heat exchanger positioned outside of the fresh food chamber and the freezer chamber of the cabinet;
   a fresh food cold side heat exchanger positioned within the cabinet at the fresh food chamber, the fresh food chamber chillable with air from the fresh food cold side heat exchanger;
   a freezer cold side heat exchanger positioned within the cabinet at the freezer chamber, the freezer chamber chillable with air from the freezer cold side heat exchanger;
   a regenerator housing having a first chamber and a second chamber, the first and second chambers separate from each other within the regenerator housing;
   a caloric material disposed within the regenerator housing, the caloric material having a first portion and a second portion, the first portion of the caloric material disposed within the first chamber, the second portion of the caloric material disposed within the second chamber;
   a fresh food working fluid circuit coupling the fresh food cold side heat exchanger and the first chamber such that a first working fluid is flowable between the fresh food cold side heat exchanger and the first chamber, the hot side heat exchanger also coupled to the fresh food working fluid circuit such that the first working fluid is flowable between the hot side heat exchanger and the first chamber, the fresh food working fluid circuit comprising a hot side outlet conduit that extends between an outlet of the hot side heat exchanger and the first chamber, the fresh food working fluid circuit further comprising a liquid-to-liquid outlet conduit that extends between a first outlet of the liquid-to-liquid heat exchanger and the first chamber;
   a freezer working fluid circuit coupling the freezer cold side heat exchanger and the second chamber such that a second working fluid is flowable between the freezer cold side heat exchanger and the second chamber, the freezer working fluid circuit comprising a freezer outlet conduit that extends between an outlet of the freezer cold side heat exchanger and the second chamber, the freezer working fluid circuit further comprising a liquid-to-liquid outlet conduit that extends between a second outlet of the liquid-to-liquid heat exchanger and the second chamber;
   a liquid-to-liquid heat exchanger connecting the fresh food working fluid circuit and the freezer working fluid circuit for heat transfer between the first and second working fluid; and
   a pump connected to the fresh food working fluid circuit and the freezer working fluid circuit, the pump operable to flow the first working fluid through the fresh food working fluid circuit and to flow the second working fluid through the freezer working fluid circuit, the pump comprising a first piston set with a first piston head and a second piston head, the first piston head of the first piston set in fluid communication with the hot side outlet conduit of the fresh food working fluid circuit, the second piston head of the first piston set in fluid communication with the freezer outlet conduit of the freezer working fluid circuit,
   wherein a freezing temperature of the first working fluid is greater than a freezing temperature of the second working fluid.

2. The refrigerator appliance of claim 1, wherein the hot side heat exchanger is positioned in a mechanical compartment of the cabinet.

3. The refrigerator appliance of claim 1, wherein the pump comprises a second piston set with a first piston head and a second piston head, the first piston head of the second piston set in fluid communication with the liquid-to-liquid outlet conduit of the fresh food working fluid circuit, the second piston head of the second piston set in fluid communication with the liquid-to-liquid outlet conduit of the freezer working fluid circuit.

4. The refrigerator appliance of claim 3, wherein the first piston set, the second piston set or both the first and second piston sets is a motor driven piston set.

5. The refrigerator appliance of claim 3, wherein one of the first piston set and the second piston set is a passive piston set that is not driven by a motor.

6. The refrigerator appliance of claim 1, wherein the first working fluid is purified water and the second working fluid comprises water and one or more of propylene glycol or ethylene glycol.

7. The refrigerator appliance of claim 1, wherein the first working fluid is purified water and the second working fluid comprises alcohol.

8. A refrigerator appliance, comprising:
   a cabinet defining a fresh food chamber and a freezer chamber;
   a fresh food cold side heat exchanger positioned within the cabinet at the fresh food chamber, the fresh food chamber chillable with air from the fresh food cold side heat exchanger;
   a freezer cold side heat exchanger positioned within the cabinet at the freezer chamber, the freezer chamber chillable with air from the freezer cold side heat exchanger;
   a regenerator housing having a first chamber and a second chamber, the first and second chambers separate from each other within the regenerator housing;
   a caloric material disposed within the regenerator housing, the caloric material having a first portion and a second portion, the first portion of the caloric material disposed within the first chamber, the second portion of the caloric material disposed within the second chamber;
   a hot side heat exchanger positioned in a mechanical compartment of the cabinet;
   a fresh food working fluid circuit coupling the fresh food cold side heat exchanger and the first chamber such that a first working fluid is flowable between the fresh food cold side heat exchanger and the first chamber, the hot side heat exchanger coupled to the fresh food working fluid circuit such that the first working fluid is flowable between the hot side heat exchanger and the first chamber, the fresh food working fluid circuit comprising a hot side outlet conduit that extends between an outlet of the hot side heat exchanger and the first chamber, the fresh food working fluid circuit further comprising a liquid-to-liquid outlet conduit that extends between a first outlet of the liquid-to-liquid heat exchanger and the first chamber;

a freezer working fluid circuit coupling the freezer cold side heat exchanger and the second chamber such that a second working fluid is flowable between the freezer cold side heat exchanger and the second chamber, the freezer working fluid circuit comprising a freezer outlet conduit that extends between an outlet of the freezer cold side heat exchanger and the second chamber, the freezer working fluid circuit further comprising a liquid-to-liquid outlet conduit that extends between a second outlet of the liquid-to-liquid heat exchanger and the second chamber;

a liquid-to-liquid heat exchanger connecting the fresh food working fluid circuit and the freezer working fluid circuit for heat transfer between the first and second working fluid; and a pump connected to the fresh food working fluid circuit and the freezer working fluid circuit, the pump operable to flow the first working fluid through the fresh food working fluid circuit and to flow the second working fluid through the freezer working fluid circuit, the pump comprising a first piston set with a first piston head and a second piston head, the first piston head of the first piston set in fluid communication with the hot side outlet conduit of the fresh food working fluid circuit, the second piston head of the first piston set in fluid communication with the freezer outlet conduit of the freezer working fluid circuit, wherein a freezing temperature of the first working fluid is greater than a freezing temperature of the second working fluid.

9. The refrigerator appliance of claim 8, wherein the pump comprises a second piston set with a first piston head and a second piston head, the first piston head of the second piston set in fluid communication with the liquid-to-liquid outlet conduit of the fresh food working fluid circuit, the second piston head of the second piston set in fluid communication with the liquid-to-liquid outlet conduit of the freezer working fluid circuit.

10. The refrigerator appliance of claim 9, wherein the first piston set, the second piston set or both the first and second piston sets is a motor driven piston set.

11. The refrigerator appliance of claim 9, wherein one of the first piston set and the second piston set is a passive piston set that is not driven by a motor.

12. The refrigerator appliance of claim 8, wherein the first working fluid is purified water and the second working fluid comprises water and one or more of propylene glycol or ethylene glycol.

13. The refrigerator appliance of claim 8, wherein the first working fluid is purified water and the second working fluid comprises alcohol.

* * * * *